United States Patent
Parlan et al.

(10) Patent No.: US 8,266,431 B2
(45) Date of Patent: Sep. 11, 2012

(54) METHOD AND APPARATUS FOR PERFORMING ENCRYPTION OF DATA AT REST AT A PORT OF A NETWORK DEVICE

(75) Inventors: Jonathan M. Parlan, Los Altos, CA (US); Raymond J. Kloth, Saratoga, CA (US); Ying Huang, Sunnyvale, CA (US); Fabio R. Maino, Palo Alto, CA (US); Pawan Agrawal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1035 days.

(21) Appl. No.: 11/264,191

(22) Filed: Oct. 31, 2005

(65) Prior Publication Data

US 2007/0101134 A1 May 3, 2007

(51) Int. Cl.
*G06F 21/00* (2006.01)
(52) U.S. Cl. ............... 713/168; 705/74; 705/7; 455/515; 455/455; 709/201; 709/238; 709/223
(58) Field of Classification Search .................... 713/168
See application file for complete search history.

(56) References Cited

U.S. PATENT DOCUMENTS

| | | |
|---|---|---|
| 4,423,480 A | 12/1983 | Bauer et al. |
| 4,435,762 A | 3/1984 | Milligan et al. |
| 4,932,826 A | 6/1990 | Moy et al. |
| 5,016,277 A * | 5/1991 | Hamilton ...................... 713/150 |
| 5,347,648 A | 9/1994 | Stamm et al. |
| 5,692,124 A * | 11/1997 | Holden et al. .................... 726/2 |
| 5,754,658 A | 5/1998 | Aucsmith |
| 5,758,151 A | 5/1998 | Milligan et al. |
| 5,765,213 A | 6/1998 | Ofer |
| 5,809,328 A | 9/1998 | Nogales et al. |
| 5,842,040 A | 11/1998 | Hughes et al. |
| 5,892,915 A | 4/1999 | Duso et al. |
| 5,930,344 A | 7/1999 | Relyea et al. |
| 6,026,468 A | 2/2000 | Mase et al. |
| 6,049,546 A | 4/2000 | Ramakrishnan |
| 6,070,200 A | 5/2000 | Gates et al. |
| 6,141,728 A | 10/2000 | Simionescu et al. |
| 6,148,421 A | 11/2000 | Hoese et al. |
| 6,172,520 B1 * | 1/2001 | Lawman et al. ................ 326/38 |

(Continued)

OTHER PUBLICATIONS

Viega J. et al., Network Working Group, "The Use of Galois/Counter mode (GCM) in IPsec Encapsulating Security Payload (ESP)," RFC 4106, Secure Software, Inc., Jun. 2005.

(Continued)

*Primary Examiner* — Taghi Arani
*Assistant Examiner* — Mahfuzur Rahman
(74) *Attorney, Agent, or Firm* — Weaver Austin Villeneuve & Sampson LLP

(57) ABSTRACT

Methods and apparatus for performing encryption for data at rest at a port of a network device such as a switch are disclosed. Specifically, when data is received from a host during a write to a storage medium such as a disk, the data is encrypted by the port prior to transmitting the encrypted data to the storage medium. Similarly, when a host attempts to read data from the storage medium, the port of the network device receives the encrypted data from the storage medium, decrypts the data, and transmits the decrypted data to the host. In this manner, encryption and decryption of data at rest are supported by the port of the network device.

37 Claims, 10 Drawing Sheets

U.S. PATENT DOCUMENTS

| | | | |
|---|---|---|---|
| 6,178,244 B1 * | 1/2001 | Takeda et al. | 380/277 |
| 6,219,728 B1 | 4/2001 | Yin | |
| 6,317,819 B1 * | 11/2001 | Morton | 712/22 |
| 6,327,253 B1 | 12/2001 | Frink | |
| 6,381,665 B2 * | 4/2002 | Pawlowski | 710/260 |
| 6,449,697 B1 | 9/2002 | Beardsley et al. | |
| 6,507,893 B2 | 1/2003 | Dawkins et al. | |
| 6,570,848 B1 | 5/2003 | Loughran et al. | |
| 6,625,750 B1 | 9/2003 | Duso et al. | |
| 6,651,162 B1 | 11/2003 | Levitan et al. | |
| 6,658,540 B1 | 12/2003 | Sicola et al. | |
| 6,751,758 B1 | 6/2004 | Alipui et al. | |
| 6,757,767 B1 | 6/2004 | Kelleher | |
| 6,775,749 B1 | 8/2004 | Mudgett et al. | |
| 6,782,473 B1 * | 8/2004 | Park | 713/160 |
| 6,788,680 B1 * | 9/2004 | Perlman et al. | 370/389 |
| 6,791,989 B1 | 9/2004 | Steinmetz et al. | |
| 6,880,062 B1 | 4/2005 | Ibrahim et al. | |
| 6,941,429 B1 | 9/2005 | Kamvysselis et al. | |
| 7,000,025 B1 | 2/2006 | Wilson | |
| 7,065,582 B1 | 6/2006 | Dwork et al. | |
| 7,165,180 B1 * | 1/2007 | Ducharme | 713/182 |
| 7,181,578 B1 | 2/2007 | Guha et al. | |
| 7,219,237 B1 * | 5/2007 | Trimberger | 713/193 |
| 7,237,045 B2 | 6/2007 | Beckmann et al. | |
| 7,290,236 B1 * | 10/2007 | Flaherty et al. | 716/116 |
| 7,295,519 B2 | 11/2007 | Sandy et al. | |
| 7,397,764 B2 | 7/2008 | Cherian et al. | |
| 7,411,958 B2 | 8/2008 | Dropps et al. | |
| 7,414,973 B2 | 8/2008 | Hart et al. | |
| 7,415,574 B2 | 8/2008 | Rao et al. | |
| 7,436,773 B2 | 10/2008 | Cunningham | |
| 7,472,231 B1 | 12/2008 | Cihla et al. | |
| 7,568,067 B1 | 7/2009 | Mase et al. | |
| 7,583,597 B2 | 9/2009 | Dropps et al. | |
| 7,617,365 B2 | 11/2009 | Zhang et al. | |
| 2001/0016878 A1 | 8/2001 | Yamanaka | |
| 2002/0024970 A1 | 2/2002 | Amaral et al. | |
| 2002/0059439 A1 | 5/2002 | Arroyo et al. | |
| 2002/0124007 A1 | 9/2002 | Zhao | |
| 2002/0169521 A1 | 11/2002 | Goodman et al. | |
| 2003/0021417 A1 * | 1/2003 | Vasic et al. | 380/277 |
| 2003/0065882 A1 | 4/2003 | Beeston et al. | |
| 2003/0093567 A1 | 5/2003 | Lolayekar et al. | |
| 2003/0185154 A1 | 10/2003 | Mullendore et al. | |
| 2004/0010660 A1 | 1/2004 | Konshak et al. | |
| 2004/0081082 A1 | 4/2004 | Moody et al. | |
| 2004/0088574 A1 * | 5/2004 | Walter et al. | 713/201 |
| 2004/0148376 A1 * | 7/2004 | Rangan et al. | 709/223 |
| 2004/0153566 A1 | 8/2004 | Lalsangi et al. | |
| 2004/0158668 A1 | 8/2004 | Golasky et al. | |
| 2004/0160903 A1 * | 8/2004 | Gai et al. | 370/254 |
| 2004/0170432 A1 | 9/2004 | Reynolds et al. | |
| 2004/0202073 A1 | 10/2004 | Lai et al. | |
| 2005/0021949 A1 * | 1/2005 | Izawa et al. | 713/165 |
| 2005/0031126 A1 * | 2/2005 | Edney et al. | 380/278 |
| 2005/0114663 A1 * | 5/2005 | Cornell et al. | 713/168 |
| 2005/0117522 A1 | 6/2005 | Basavaiah et al. | |
| 2005/0144394 A1 | 6/2005 | Komaria et al. | |
| 2005/0192923 A1 * | 9/2005 | Nakatsuka | 707/1 |
| 2006/0018293 A1 | 1/2006 | Farley | |
| 2006/0039370 A1 | 2/2006 | Rosen et al. | |
| 2006/0059313 A1 | 3/2006 | Lange | |
| 2006/0059336 A1 * | 3/2006 | Miller et al. | 713/165 |
| 2006/0112149 A1 | 5/2006 | Kan et al. | |
| 2006/0126520 A1 | 6/2006 | Nambiar et al. | |
| 2006/0214766 A1 | 9/2006 | Ghabra | |
| 2006/0248278 A1 | 11/2006 | Beeston et al. | |

OTHER PUBLICATIONS

ISR and Written Opinion dated Mar. 26, 2008 from corresponding PCT Application No. PCT/US06/42477, 7 pgs.

U.S. Final Office Action dated Oct. 16, 2009 from U.S. Appl. No. 11/015,383.

U.S. Office Action dated Sep. 3, 2009 from related U.S. Appl. No. 11/220,490.

U.S. Final Office Action dated Mar. 3, 2010 from related U.S. Appl. No. 11/220,490.

U.S. Non-Final Office Action dated Aug. 24, 2010, from U.S. Appl. No. 11/015,383.

U.S. Notice of Allowance dated Jul. 27, 2010 from related U.S. Appl. No. 11/220,490.

CN First Office Action dated Jan. 26, 2011, from CN Appl. No. 200680023522.7.

U.S. Non-Final Office Action dated May 6, 2011 from U.S. Appl. No. 11/015,383.

U.S. Final Office Action dated Dec. 23, 2010, U.S. Appl. No. 11/015,383.

U.S. Notice of Allowance dated Feb. 2, 2011 from related U.S. Appl. No. 11/220,490.

CN Second Office Action dated Sep. 13, 2011, from CN Appl. No. 200680023522.7.

U.S. Final Office Action dated Sep. 14, 2011 from U.S. Appl. No. 11/015,383.

U.S. Notice of Allowance dated May 19, 2011 from related U.S. Appl. No. 11/220,490.

U.S. Notice of Allowance dated Sep. 29, 2011 from related U.S. Appl. No. 11/220,490.

U.S. Office Action dated Nov. 14, 2011 from U.S. Appl. No. 12/434,477.

Austin Modine, "HP adds Encryption Gear for Storage Systems, Tape and Virtual Tape get Algorithmed," The Register, printed on Apr. 28, 2009 from URL: http://www.theregister.co.uk/2008/04/04/hp_storage_encryption_add_ons, 2 pgs.

Cisco MDS 9000 Intelligent Fabric Applications, "Fibre Channel Write Acceleration" printed on Apr. 28, 2009 from website: http://www.cisco.com/en/US/prod/collateral/ps4159/ps6409/ps5989/ps6217/prod_white_paper, 7 pgs.

StorageTek: The Leader in Information Lifecycle Management Solutions, http://www.storagetek.com, printed Aug. 4, 2005, p. 1.

Forouzan et al., "TCP/IP Protocol Suite", 2002, McGraw-Hill Professional, Second Edition, Section 12.4, pp. 305-308.

U.S. Appl. No. 11/220,490, filed Sep. 6, 2005, 30 pgs.

U.S. Appl. No. 11/015,383, filed Dec. 15, 2005, 27 pgs.

U.S. Office Action dated Nov. 15, 2007 from related U.S. Appl. No. 11/220,490, 14 pgs.

U.S. Office Action dated May 28, 2008 from related U.S. Appl. No. 11/220,490, 22 pgs.

U.S. Office Action dated Dec. 5, 2008 from related U.S. Appl. No. 11/220,490, 17 pgs.

U.S. Final Office Action dated Mar. 24, 2009 from related U.S. Appl. No. 11/220,490, 19 pgs.

U.S. Office Action dated Apr. 2, 2009 from related U.S. Appl. No. 11/015,383, 16 pgs.

Parthasarathy et al., "Storage Media Encryption with Write Acceleration," Cisco Technology, Inc., U.S. Appl. No. 12/434,477, filed May 1, 2009; 38 pgs.

* cited by examiner

Key table 302

| Disk 306 | Key 304 |
|---|---|
|  |  |
|  |  |
|  |  |
|  |  |
|  |  |

FIG. 3

Transaction table 402

| Host_ID 404 | Exchange ID (OX_ID) 406 | Logical Block Address (LBA) 408 | Key (K) 410 | Partial block size 412 | Encryption/Decryption (Write/Read) 414 |
|---|---|---|---|---|---|
|  |  |  |  |  |  |
|  |  |  |  |  |  |
|  |  |  |  |  |  |
|  |  |  |  |  |  |

FIG. 4

METHOD AND APPARATUS FOR PERFORMING ENCRYPTION OF DATA AT REST AT A PORT OF A NETWORK DEVICE

BACKGROUND OF THE INVENTION

The present invention relates to network technology. More specifically, this invention relates to mechanisms for performing encryption for data at rest at a port of a network device.

Security of data is typically achieved through encryption of the data. While data is often encrypted to secure the data during its transmission, data may also be encrypted in order to secure the data once it has been stored. Encryption of data that is stored on a storage medium is typically referred to as encryption of data-at-rest (EAR). Specifically, the data that is stored on the storage medium remains encrypted after it has been stored. There are a number of approaches to encrypting data-at-rest.

One approach to performing encryption of data-at-rest that is implemented by a number of products is to encrypt data at a network appliance responsible for encrypting data received from a source network device prior to providing the encrypted data to a storage medium. In a network such as a Storage Area Network (SAN) in which numerous storage devices are supported, the network appliance is typically responsible for the encryption of data received from multiple sources. Within such a network appliance, encryption is often performed by a hardware-accelerated encryptor. Since this single encryptor must service numerous sources, the performance of the network appliance is limited.

Another approach to encrypting data-at-rest that is commonly applied is to perform encryption at the source network device that is generating the data, or at the storage medium that will store the data. In these approaches, encryption is performed in software, since hardware acceleration would significantly impact the cost of the encrypting source network device or storage medium.

While these approaches can provide a viable solution for encryption of data, these approaches afford limited throughput and higher cost. For instance, existing network appliances encrypt data with a throughput of several hundred megabits per second. While these approaches are sufficient to service a limited number of storage media, there is currently no solution for pervasive protection of storage data-at-rest that can afford wire-speed protection to an entire set of storage media in a multi-gigabit SAN.

For those customers who want to encrypt all of their storage, the existing solutions are insufficient to address this requirement. Specifically, existing solutions for performing encryption at a network appliance do not scale to address this requirement, while solutions for performing encryption at the source or destination network devices are not economically feasible.

In view of the above, it would be desirable if a scalable, economical approach to encrypting data at rest could be developed.

SUMMARY OF THE INVENTION

Methods and apparatus for performing encryption of data at rest are disclosed. This is accomplished, in part, by performing encryption of data being written to memory at a port of a network device such as a switch. In this manner, encryption of data at rest is supported by a port of a network device.

In the following description, data and commands are described as being transmitted in the form of frames. However, it is important to note that these examples are merely illustrative. Thus, data and commands may also be transmitted in the form of packets. Accordingly, the terms "frame" and "packet" may be used interchangeably.

In accordance with one aspect of the invention, a port of a network device such as a switch performs encryption of data at rest. Specifically, when a network device receives data from a host during a write to a storage medium such as a disk, the data is encrypted by the port of the network device prior to transmitting the encrypted data to the storage medium. More particularly, when a frame including data is received by one of the ports of the network device, the port obtains the data from the frame. The port encrypts the data, generates a modified frame including the encrypted data, and transmits the modified frame to its destination. The destination may be a storage medium such as a disk or tape.

In accordance with another aspect of the invention, a port of a network device such as a switch performs decryption of data at rest. Specifically, when a host attempts to read data from the storage medium, the port of the network device receives the encrypted data from the storage medium, decrypts the data, and transmits the decrypted data to the host. More particularly, when a frame including data is received by one of the ports of the network device, the port obtains the data from the frame. The port decrypts the data, generates a modified frame including the decrypted data, and transmits the modified frame to its destination (e.g., host requesting the data).

In accordance with another aspect of the invention, the invention pertains to a system operable to perform and/or initiate any of the disclosed methods in a port of a network device such as a switch. The system includes one or more processors and one or more memories. At least one of the memories and processors is adapted to provide at least some of the above described method operations. In yet a further embodiment, the invention pertains to a computer program product for performing the disclosed methods. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures, which illustrate by way of example the principles of the invention.

BRIEF DESCRIPTION OF THE DRAWINGS

FIG. 3 illustrates an exemplary key table that may be maintained in accordance with one embodiment of the invention.

FIG. 4 illustrates an exemplary transaction table that may be maintained in accordance with one embodiment of the invention.

DETAILED DESCRIPTION OF SPECIFIC EMBODIMENTS

Figure 1:
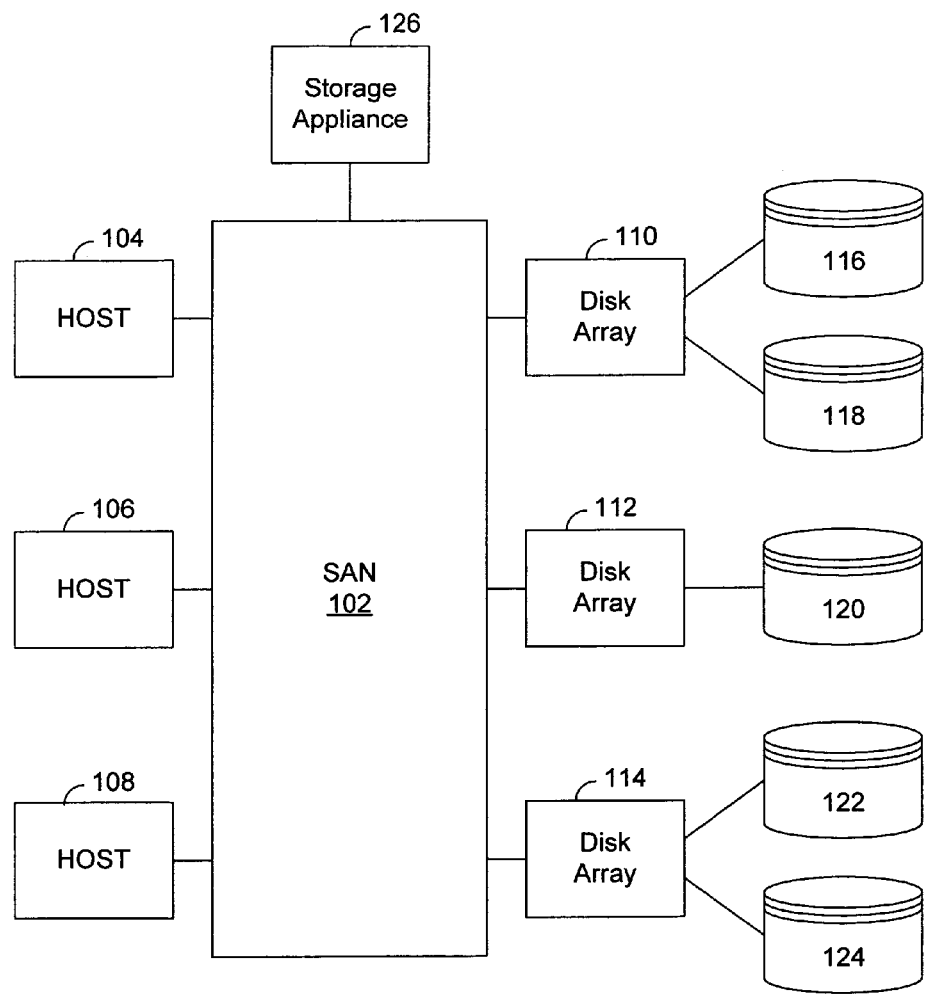
FIG. 1 is a block diagram illustrating an exemplary conventional storage area network.

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Embodiments of the invention support encryption of data at rest at a port of a network device. In this manner, data may be encrypted prior to storing the encrypted data on a storage medium (e.g., disk, tape) that is separate from the network device. Similarly, the port of the network device also performs decryption of data at rest, thereby enabling encrypted data stored on the storage medium to be retrieved.

The disclosed embodiments of the invention may be implemented in a network device such as a switch. Note that the frames and/or packets being received and transmitted by such a switch possess the frame format specified for a standard protocol such as Ethernet or Fibre Channel. Hence, software and hardware conventionally used to generate such frames may be employed with this invention. Additional hardware and/or software may be employed to modify and/or generate frames compatible with the standard protocol in accordance with this invention. Those of skill in the art will understand how to develop the necessary hardware and software to allow encryption for data at rest as described below.

In addition, the disclosed embodiments of this invention are implemented on a per port basis. In other words, a multi-port network device (e.g., switch) will have the disclosed functionality separately implemented on one or more of its ports. Individual ports have dedicated logic for handing the disclosed functions for packets or frames handled by the individual ports. This allows the processing capacity to be closely matched with the exact needs of the switch on a per port basis.

In order to support encryption of data at rest and decryption of data at rest, a modified frame is generated by a network device such as a switch for transmission to a storage device (in the case of encryption of data at rest) or host (in the case of decryption of data at rest), respectively, as will be described in further detail below. Obviously, the appropriate network devices should be configured with the appropriate software and/or hardware for performing the disclosed functionality. Of course, all network devices within the storage area network need not be configured with the disclosed functionality. Rather, selected switches and/or ports may be configured with or adapted for the disclosed functionality. Similarly, in various embodiments, such functionality may be enabled or disabled through the selection of various modes. Moreover, it may be desirable to configure selected ports of network devices as ports capable of performing the disclosed functionality, either continuously, or only when in an enabled state.

The disclosed embodiments may be implemented in a network in which a server or other host accesses a storage device to read or write data. One type of network in which the disclosed embodiments may be implemented is a storage area network (SAN). Generally, a storage area network is a high-speed special-purpose network that interconnects different data storage devices and associated data hosts on behalf of a larger network of users.

FIG. 1 illustrates an exemplary conventional storage area network. More specifically, within a storage area network 102, it is possible to couple a set of hosts (e.g., servers or workstations) 104, 106, 108 to a pool of storage devices (e.g., disks). In SCSI parlance, the hosts may be viewed as "initiators" and the storage devices may be viewed as "targets." A storage pool may be implemented, for example, through a set of storage arrays or disk arrays 110, 112, 114. Each disk array 110, 112, 114 further corresponds to a set of disks. In this example, first disk array 110 corresponds to disks 116, 118, second disk array 112 corresponds to disk 120, and third disk array 114 corresponds to disks 122, 124. Rather than enabling all hosts 104-108 to access all disks 116-124, it is often desirable to enable the dynamic and invisible allocation of storage (e.g., disks) to each of the hosts 104-108 via the disk arrays 110, 112, 114. In other words, physical memory (e.g., physical disks) may be allocated through the concept of virtual memory (e.g., virtual disks). This allows one to connect heterogeneous initiators to a distributed, heterogeneous set of targets (storage pool) in a manner enabling the dynamic and transparent allocation of storage.

Many storage area networks in commerce run a SCSI protocol to access storage sites. Frequently, the storage area network employs Fibre Channel (FC-PH (ANSI X3.230-1994, Fibre Channel—Physical and Signaling Interface) as a lower level protocol and runs SCSI on top of Fibre Channel. Note that the invention is not limited to any of these protocols. For example, Fibre Channel may be replaced with Ethernet, Infiniband, and the like. Further the higher level protocols need not include SCSI. For example, other protocols may be used by hosts to access storage. In addition, it is important to note that SCSI will be used herein to refer to any implementation of SCSI over FC, iSCSI (SCSI over IP), parallel SCSI (SCSI over a parallel cable), serial SCSI (SCSI over serial cable), and to all the other incarnations of SCSI.

In the following description, the described embodiments are disclosed with reference to SCSI READ and WRITE commands transmitted using the Fibre Channel protocol. However, the disclosed embodiments are merely illustrative. Thus, the disclosed embodiments may also be implemented using other protocols.

When a host writes data to a storage device, encryption of the data is performed prior to storing the data. Similarly, when the host reads the encrypted data from the storage device, the data is decrypted. In the following description, these encryption and decryption functions are performed by the port of a network device such as a switch or router that is separate from the storage device.

Figure 2:
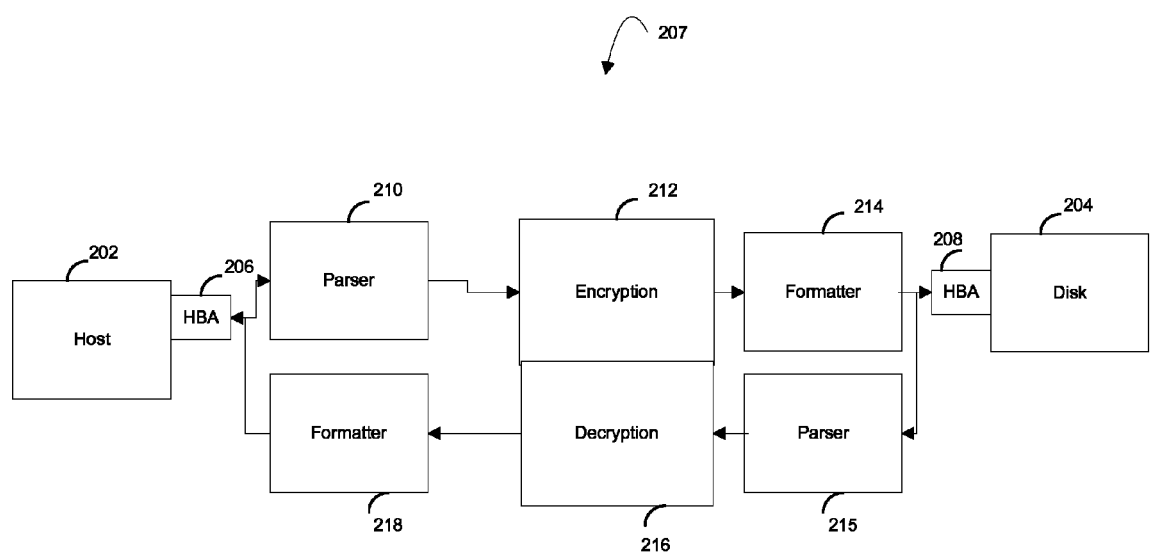
FIG. 2 is a block diagram illustrating a system in which encryption or decryption of data at rest may be performed at a port of a network device in accordance with one embodiment of the invention.

FIG. 2 is a block diagram illustrating a system in which encryption or decryption of data at rest may be performed at a port of a network device in accordance with one embodiment of the invention. A host 202 may wish to store data to a storage medium 204 or, alternatively, retrieve data from the storage medium 204. When the host 202 sends the data via its Host Bus Adapter (HBA) 206, it is encrypted by a port 207 of a network device and transmitted to the storage medium 204, where it is received by its HBA 208. Similarly, when the host 202 retrieves data from the storage medium 204, it is transmitted via the HBA 208 of the storage medium 204, decrypted by the port 207 of the network device, and received by the host 202 via its HBA 206.

As shown, when the port 207 of the network device receives a command such as a read or write command from the host 202, the port 207 parses the command via a parser 210 in order to obtain and store information from the command (e.g., from a header) so that the information can be subsequently used to enable the corresponding data that is stored or retrieved to be encrypted or decrypted, as appropriate. This information may be stored in a transaction table such as that described below with reference to FIG. 4. The command is then transmitted unchanged to the storage medium 204.

In case the transaction table is full, the network device (e.g., switch) may reply to the read or write command with an appropriate message (e.g., a SCSI error code) to the host 202. For instance, the message may signal to the host 202 that the device is temporarily unavailable and/or the transaction should be attempted again later.

After the command is sent by the host 202 and assuming that the transaction table is not full, data is either transmitted by the host 202 or retrieved by the host 202. Specifically, after a write command is transmitted by the host 202, the host 202 sends data to be stored by the storage medium 204. For instance, when a write data frame including data is received by the port 207 from the host 202, a parser 210 parses the write data frame to obtain information from the header of the write data frame. This header information may then be used to look up and retrieve the appropriate information corresponding to the write command that has previously been received. This information may indicate that the data is to be encrypted, as well as include an encryption/decryption key and other information that may be provided to an encryption module 212.

Once the data has been encrypted and a modified frame (e.g., write data frame) including the encrypted data has been generated by the port 207, the modified frame may be formatted by a formatter 214 prior to transmitting the modified frame to the storage medium 204. Specifically, a signature such as a cyclic redundancy check (CRC) or checksum value used to verify the integrity of the data may have been appended to the frame that was received by the port 207. However, this signature corresponds to the data received rather than the encrypted data. Thus, the formatter 214 may replace the original signature with one that corresponds to the modified frame, which enables the integrity of the encrypted data to be verified by the storage medium 204.

Similarly, after a read command is transmitted by the host 202, the host 202 receives data from the storage medium 204 (e.g., via a read data frame). This frame including the data may then be parsed to obtain header information to enable information associated with the corresponding read command to be looked up and retrieved. For instance, when a read data frame is received by the port 207 from the storage medium 204, a parser 215 parses the read data frame to obtain header information so that it can look up and retrieve the appropriate information corresponding to the read command. This information may indicate that the data is to be decrypted, as well as include an encryption/decryption key and other information that may be provided to a decryption module 216.

Once the data has been decrypted (e.g., by a decryption module), the port 207 generates a modified frame (e.g., read data frame), which may be formatted by a formatter 218 prior to transmitting the modified read data frame to the host 202. Specifically, if a signature was present in the read data frame received by the port 207, the formatter 218 may replace the original signature with one that corresponds to the read data frame, which enables the integrity of the decrypted data to be verified by the host 202.

It is important to note that although two different parsers and formatters are illustrated, this example is merely illustrative. Thus, a single parser may be used to process frames received from both the host and the disk. Similarly, a single formatter may be used to format read frames, as well as write frames.

In order to encrypt data prior to storing the data and decrypt the stored data, an encryption/decryption key may be associated with each storage medium. For instance, a key table may be used to store keys for a plurality of storage mediums. FIG. 3 illustrates an exemplary key table 302 that may be maintained in accordance with one embodiment of the invention. As shown, each key 304 may be associated with a particular storage medium 306 (e.g., disk). Moreover, a disk may contain any number of LUNs, and may have different keys associated with different LUNs. As will be described in further detail below with reference to FIG. 4, the key that is used to encrypt/decrypt data transmitted during a particular transaction may be recorded in a transaction table, along with a source identifier (S_ID), destination identifier (D_ID) and/or logical unit (LUN) relevant to the transaction. $_{[JMP1]}$ Thus, regions on a storage medium 306 (e.g., disk) may encrypt/decrypt with unique keys. The key table 302 may be maintained by the network device (e.g., switch) or by each port of the network device. Key discovery, creation, and management may be accomplished in a variety of ways, which are outside the scope of this invention.

Once keys are established for each storage medium, it may be desirable to modify the keys periodically to ensure security of the data. This may include the storing of the new key(s) in key and transaction tables, as appropriate. In order to enable the data that is stored on a disk to be decrypted with the old key and encrypted with the new key, both keys should be maintained at the switch until no longer needed. For instance, two different key tables may be maintained, where one of the tables stores the old keys and the other table stores the new keys.

It is important to note that once the new key is configured, the encrypted data that is stored on the disk is preferably encrypted with the new key. In other words, this data may be decrypted with the old key and encrypted with the new key. This may be accomplished while the disk is on-line or off-line.

If the key/data migration is performed while the disk is on-line, a background task may be run to decrypt and encrypt the data on the disk block by block until all of the data is encrypted with the new key for that disk. This may be accomplished, for example, by initiating block replacement at an initial LBA and maintaining a pointer or variable that indicates the LBA separating data that has been encrypted with the old key from data that has been encrypted with the new key.

Alternatively, the disk may be taken off-line to perform key/data migration. For instance, a second disk may be used to store the data that has been encrypted with the new key. More specifically, the data that has already been encrypted with the old key may be retrieved from the first disk, decrypted with the old key, encrypted with the new key, and stored on the second disk. New writes are also performed with the new key to the second disk. The second disk then replaces the first disk. For instance, the encrypted data on the second disk may be copied to the first disk, thereby replacing the data that has been encrypted with the old key.

As described above, when a command such as a read or write command is received by the port of the network device, the command is parsed and information obtained from the command (e.g., command header) is stored to enable the data that follows to be encrypted or decrypted, as appropriate. For instance, this information may be stored in a transaction table.

FIG. 4 is an exemplary transaction table that may be maintained in accordance with one embodiment of the invention. As shown, the transaction table 402 may store a plurality of entries. Each entry may store a host identifier (Host_ID) 404 obtained from a header of the frame, an Original Exchange Identifier (OX_ID) 406 (i.e., exchange or transaction identifier), a logical block address (LBA) 408, a key (K) 410 obtained from a data structure such as the key table 302 shown in FIG. 3, a partial block size 412 obtained from a header of the frame (where a frame includes a partial block), and/or an encryption/decryption indicator 414 indicating that data is to be encrypted for a write command or that data is to be decrypted for a read command. Encryption/decryption is to be performed using the key 410, and may also be performed using the LBA as a nuance. The Host_ID 404 may store a source identifier or destination identifier. For instance, for a write data frame, the Host_ID 404 will store the source identifier obtained from the header of the write data frame. However, for a read data frame, the Host_ID 404 will store the destination identifier obtained from the header of the read data frame. The OX_ID 406 may be obtained from a Fibre Channel header and the LBA 408 may be obtained from the header of a SCSI frame. The partial block size 412 may be used to store the size of data transmitted where the frame includes a partial block. Similarly, the encryption/decryption indicator 414 may be set to indicate whether the command is a read or write command, indicating that data is to be decrypted or encrypted, respectively. Alternatively, entries corresponding to read and write commands may be stored in separate tables. In accordance with one embodiment, a transaction table 402 is maintained by each port of the network device. If the transaction table is full and a new transaction is present, the corresponding read or write command may be intercepted, enabling an error message to be transmitted to the sender of the read or write command. For instance, the error message may indicate that the device is temporarily unavailable, and the transaction should be attempted again later.

Figure 5:
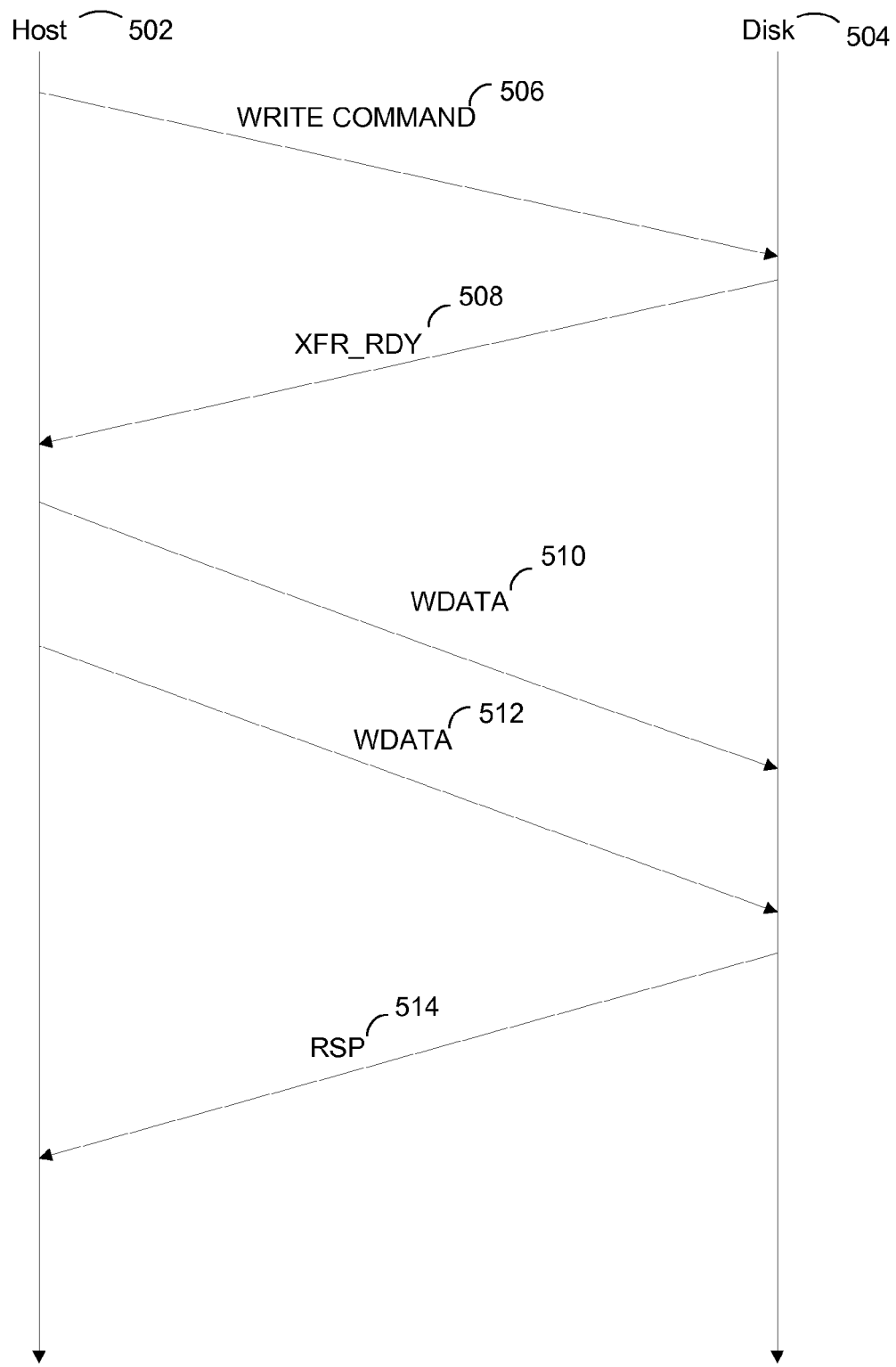
FIG. 5 is a transaction flow diagram illustrating a SCSI write.

In order to illustrate the application of embodiments of the invention during a write, steps performed during a SCSI write are presented in FIG. 5. As shown, steps performed by a host are represented by vertical line 502 and steps performed by a disk are represented by vertical line 504. As shown in FIG. 5, the host transmits a SCSI_WRITE command to the disk at 506. The SCSI_WRITE command specifies the amount of data to be written to the disk. When the disk is ready to receive the data, the disk sends a transfer ready (XFR_RDY) message to the disk at 508. The host then transfers data in one or more write data (WDATA) messages at 510, 512. The disk then sends a response (RSP) to the host at 514 acknowledging that the data was successfully transferred.

Figure 6:
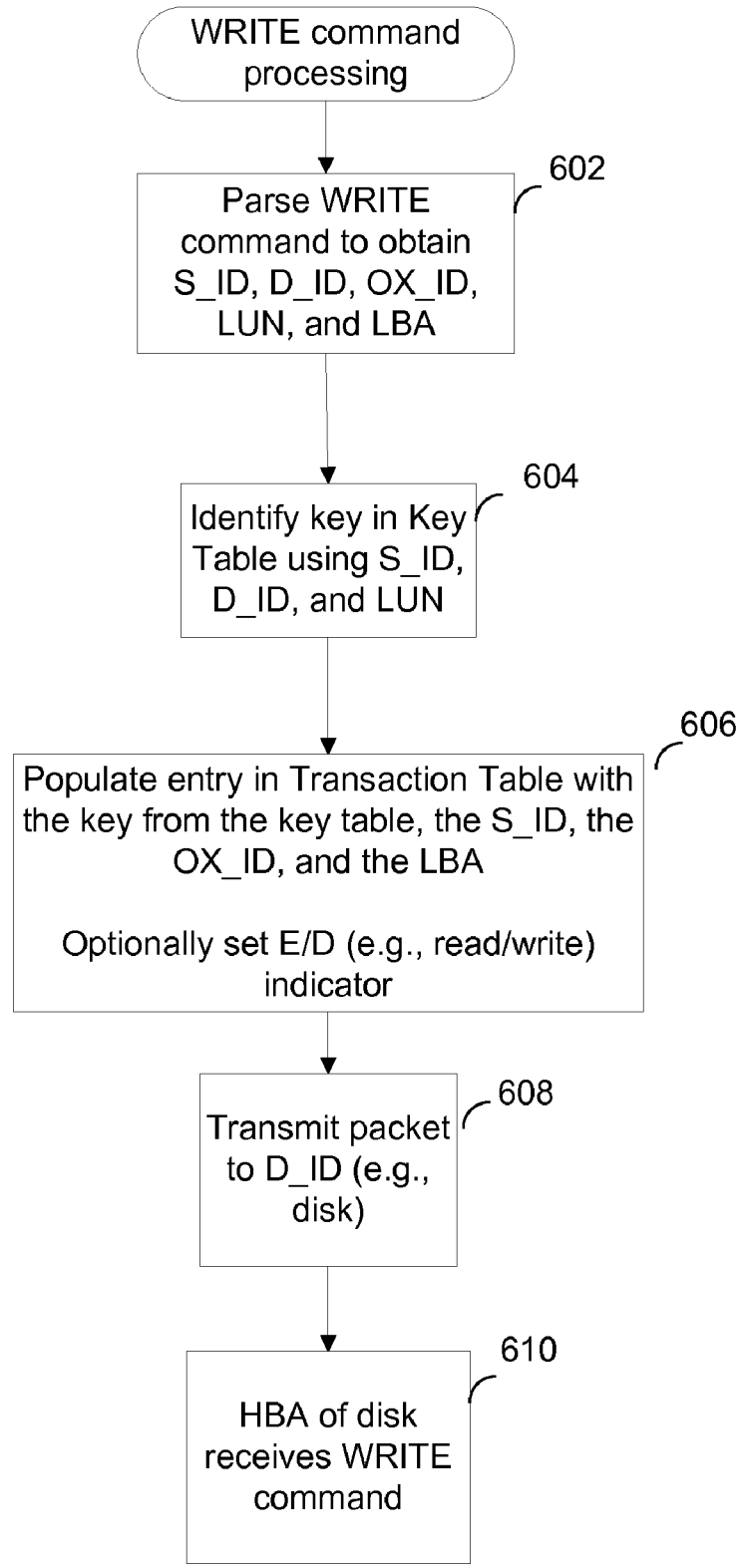
FIG. 6 is a process flow diagram illustrating a method of processing a write command in accordance with one embodiment of the invention.

FIG. 6 is a process flow diagram illustrating a method of processing a write command in accordance with one embodiment of the invention. When a write command is received by a port of a network device (e.g., switch), it is parsed at 602 to obtain fields identifying the source and destination of the write command, as well as other information. For instance, a source identifier (e.g., S_ID), Original Exchange Identifier (OX_ID), and destination identifier (e.g., D_ID) may obtained from a header such as a Fibre Channel header. In addition, where the command is a SCSI command, a Logical Unit (LUN), and logical block address (LBA) may be obtained from the SCSI header. A key to be used to encrypt data transmitted by the host to be stored at the disk may then be obtained at 604. In accordance with one embodiment, the S_ID, D_ID and LUN are used to index a key table such as that presented in FIG. 3 in order to identify the appropriate key. As described above with reference to FIG. 3, the key table may include previously configured keys and/or new, replacement keys. An entry in a transaction table such as that illustrated in FIG. 4 is then populated at 606. In this example, the entry is populated with the key, host identifier (S_ID), OX_ID, and LBA. In addition, an encryption/decryption (e.g., write/read) indicator may be set to indicate that the key is to be used to encrypt data transmitted during the write. The write command is transmitted to the destination unchanged at 608. The disk (e.g., HBA) receives the write command at 610 and transmits a XFR_RDY message.

Figure 7:
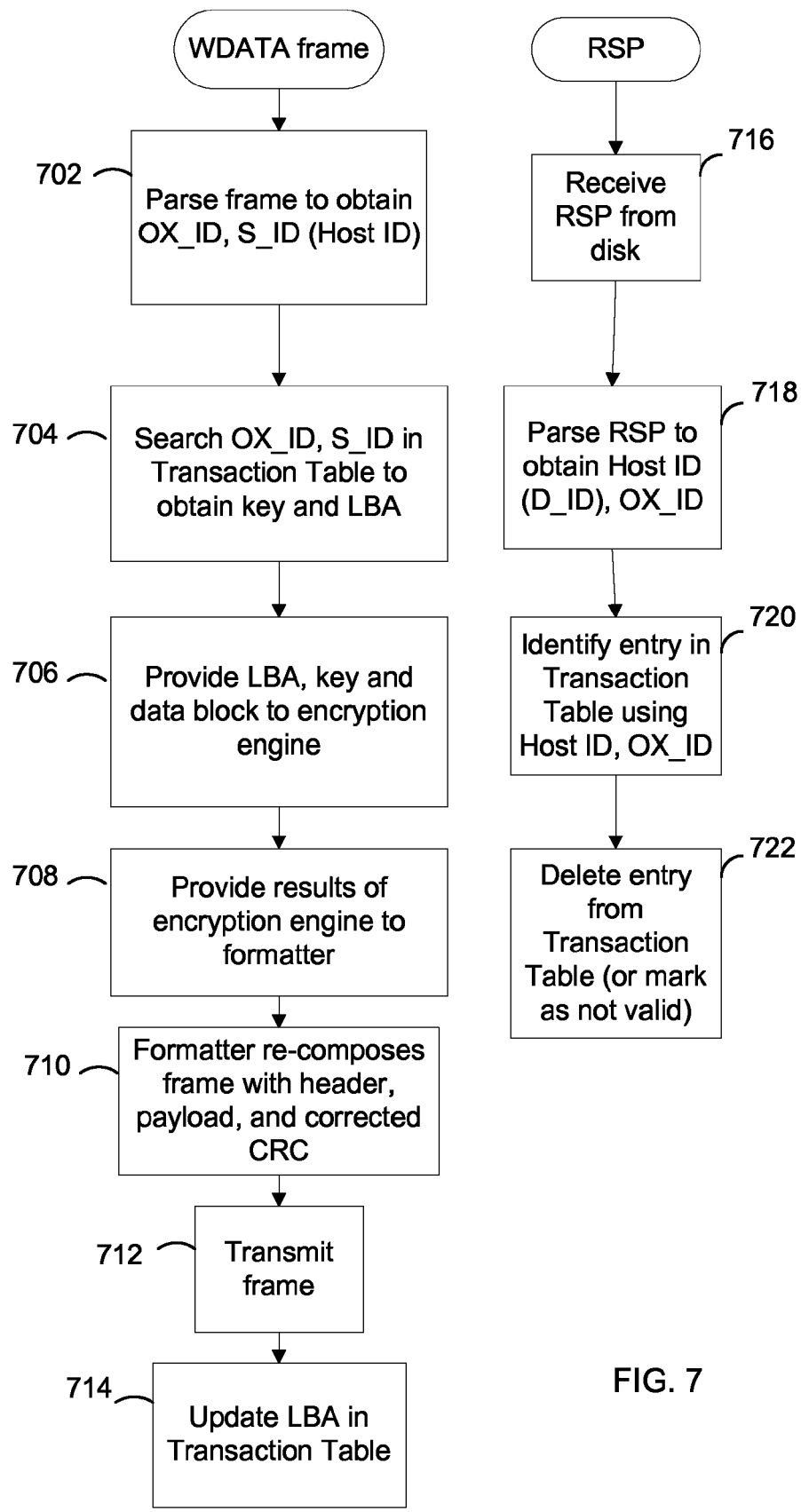
FIG. 7 is a process flow diagram illustrating a method of writing data to a storage medium in accordance with one embodiment of the invention.

After the write command has been processed, data that is subsequently transmitted during the transaction may be encrypted and stored at the storage medium. FIG. 7 is a process flow diagram illustrating a method of writing data to a storage medium in accordance with one embodiment of the invention. When a port of the network device receives data in the form of a SCSI write via a write data (WDATA) frame, the WDATA frame is parsed at 702 in order to identify the corresponding encryption key. For instance, the WDATA frame may be parsed to obtain the host identifier (S_ID) and OX_ID. The corresponding entry in a transaction table such as that illustrated in FIG. 4 is then identified at 704. Specifically, the host identifier (S_ID) and OX_ID may be used to identify the entry in the transaction table. From the entry in the transaction table, the key to be used to encrypt the data may be identified. In addition, the LBA may also be identified.

In accordance with one embodiment, the encryption engine performs per-block encryption. In other words, the encryption engine processes entire blocks (e.g., as defined by a disk operating system). Thus, in order to encrypt the data, the data block and key are provided to the encryption engine at 706. More particularly, an entire block may be gathered (e.g., where a single packet carries a non-integral number of blocks) before it is presented to the encryption engine. In addition, the LBA indicating the start address of the data block may also be provided to the encryption engine, thereby enabling the encryption engine to encrypt the block using the key and LBA. Specifically, the logical position of the block in the disk (e.g., the LBA) may be used as a nuance for the encryption of the data, causing unique encrypted data to be generated even when two blocks contain the same unencrypted data. Each block of data may be encrypted in this manner.

Once the data has been encrypted, the results of the encryption may be provided to a formatter at 708. The formatter may then generate a frame including a header (e.g., Fibre Channel), payload (e.g., SCSI) including the encrypted data, and signature, as appropriate, at 710. Various mechanisms are available for ensuring the integrity of the data without increasing the size of the frame with extra bits. For instance, Extended Codebook (XCB) mode of operation for block ciphers may be implemented to ensure the integrity of the data. The XCB mode of operation enables disc blocks to be encrypted without expanding the size of each block. Various methods and apparatus for implementing the XCB mode of operation for block ciphers are disclosed in U.S. patent application Ser. No. 11/201,626, entitled "Enciphering Method," filed on Aug. 10, 2005, by Mcgrew et al, which is incorporated herein by reference for all purposes. As another example, the Galois/Counter Mode (GCM), disclosed in RFC 4106, entitled "The Use of Galois/Counter Mode (GCM) in IPSec Encapsulating Security Payload (ESP)," J. Viega et al, published June 2005 and incorporated herein by reference for all purposes, may be used to encrypt tapes. The generated frame is then transmitted at 712 to its destination.

As data is written to the storage medium, the address at which data is to be stored is typically incremented as data is stored. In accordance with one embodiment, the address (e.g., LBA) is incremented by the amount of data that has been transmitted and updated in the transaction table at 714.

When a response indicating that all data has been received is transmitted by the disk and received by the port at 716, the transaction table may be updated accordingly. In order to identify the appropriate entry in the transaction table, the host identifier (D_ID) and OX_ID are obtained from the response at 718. The corresponding entry in the transaction table is then identified using the host identifier and OX_ID at 720. The entry may then be deleted or marked as no longer valid at 722.

Figure 8:
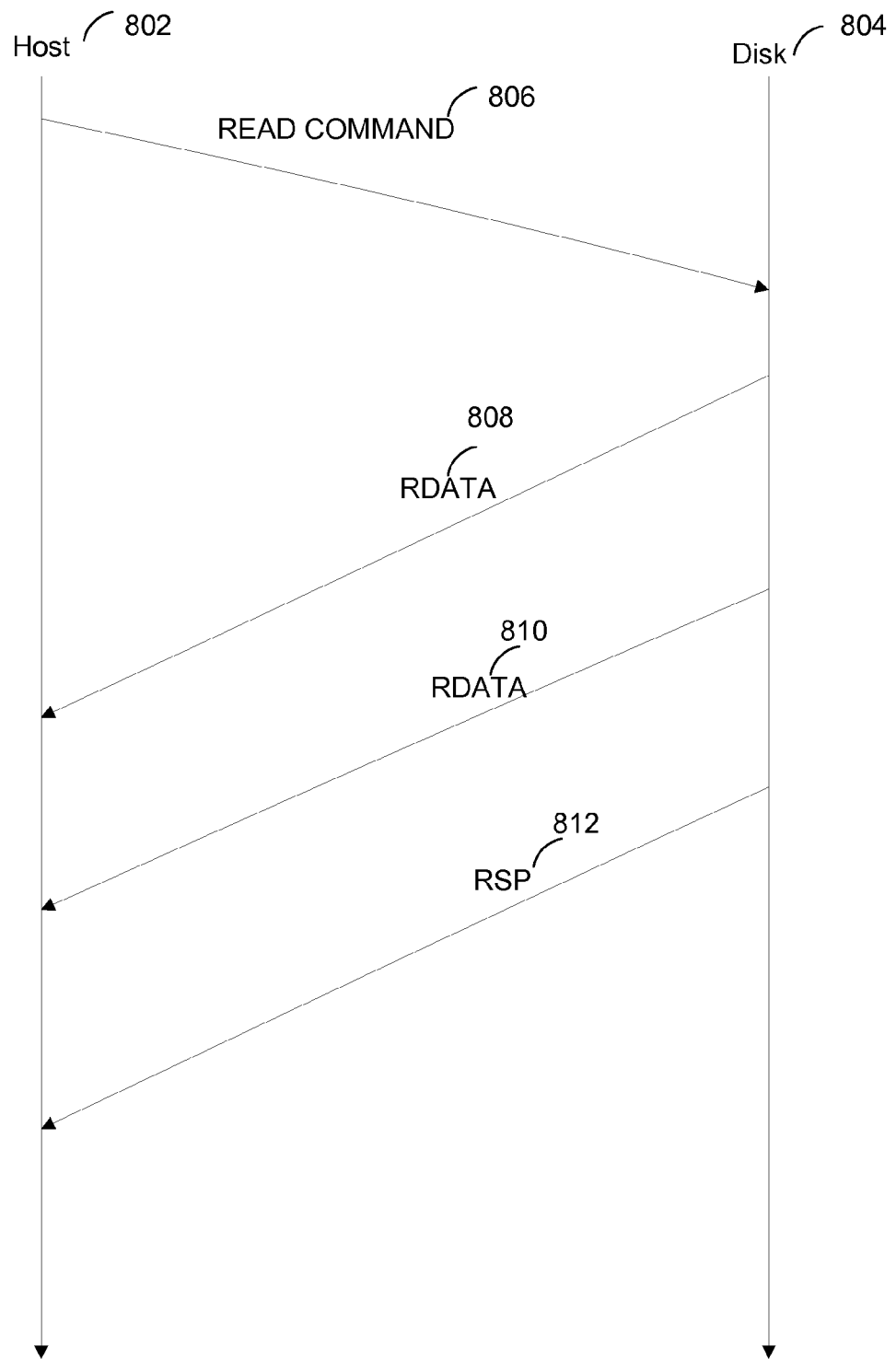
FIG. 8 is a transaction flow diagram illustrating a SCSI read.

In order to illustrate the application of embodiments of the invention during a read, steps performed during a SCSI read are presented in FIG. 8. As shown, steps performed by a host are represented by vertical line 802 and steps performed by a disk are represented by vertical line 804. As shown in FIG. 8, the host transmits a SCSI_READ command to the disk at 806. The disk transmits the data in one or more read data (RDATA) frames as shown at 808, 810. When all of the data that has been requested has been transmitted, the disk sends a response (RSP) to the host at 812.

Figure 9:
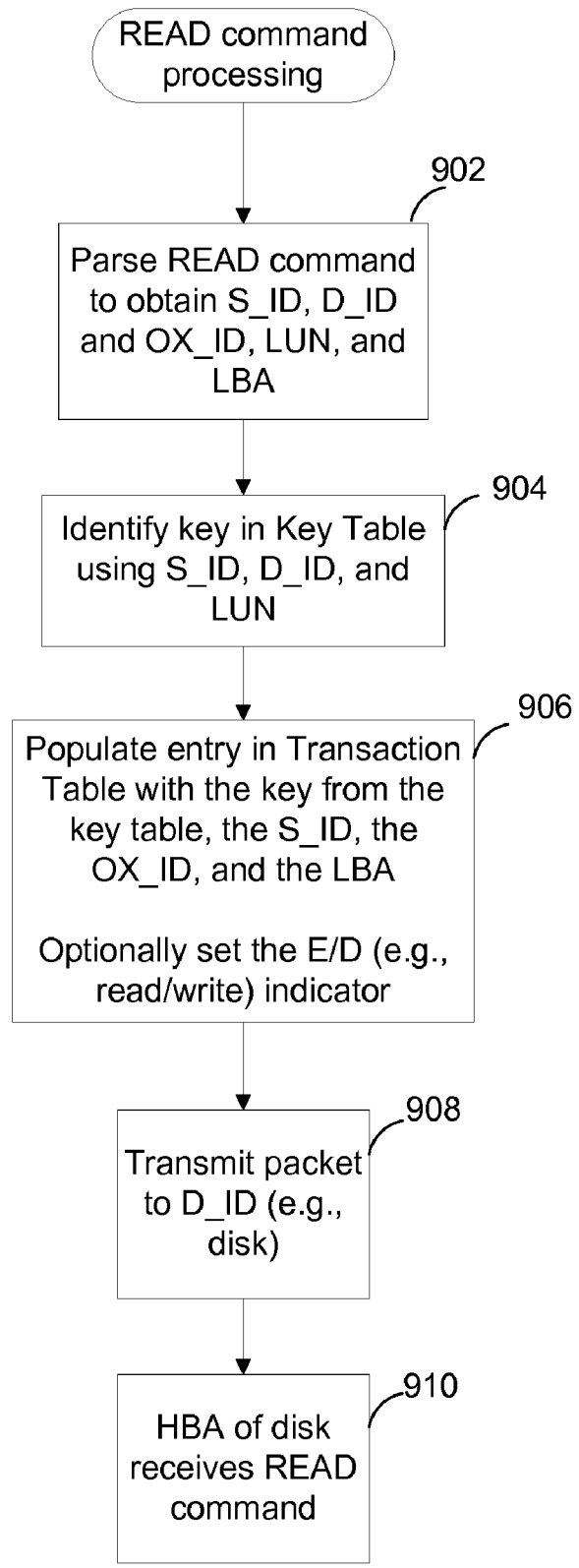
FIG. 9 is a process flow diagram illustrating a method of processing a read command in accordance with one embodiment of the invention.

FIG. 9 is a process flow diagram illustrating a method of processing a read command in accordance with one embodiment of the invention. When a port of the network device (e.g., switch) receives a read command, it parses the read command at 902 to obtain fields identifying the source and destination of the read command, as well as other information. For instance, a source identifier (e.g., S_ID), Original Exchange Identifier (OX_ID), and destination identifier (e.g., D_ID) may obtained from a header such as a Fibre Channel header. In addition, where the command is a SCSI command, a Logical Unit (LUN), and logical block address (LBA) may be obtained from the SCSI header. A key to be used to decrypt data stored at the disk may then be obtained at 904. In accordance with one embodiment, the S_ID, D_ID and LUN are used to index a key table such as that presented in FIG. 3 to identify the appropriate key. An entry in a transaction table such as that illustrated in FIG. 4 is then populated at 906. In this example, the entry is populated with the key, host identifier (S_ID), OX_ID, and LBA. In addition, an encryption/decryption (e.g., write/read) indicator may be set to indicate that the key is to be used to decrypt data retrieved during the read. The read command is transmitted to the destination unchanged at 908. The disk (e.g., HBA) receives the read command at 910.

Figure 10:
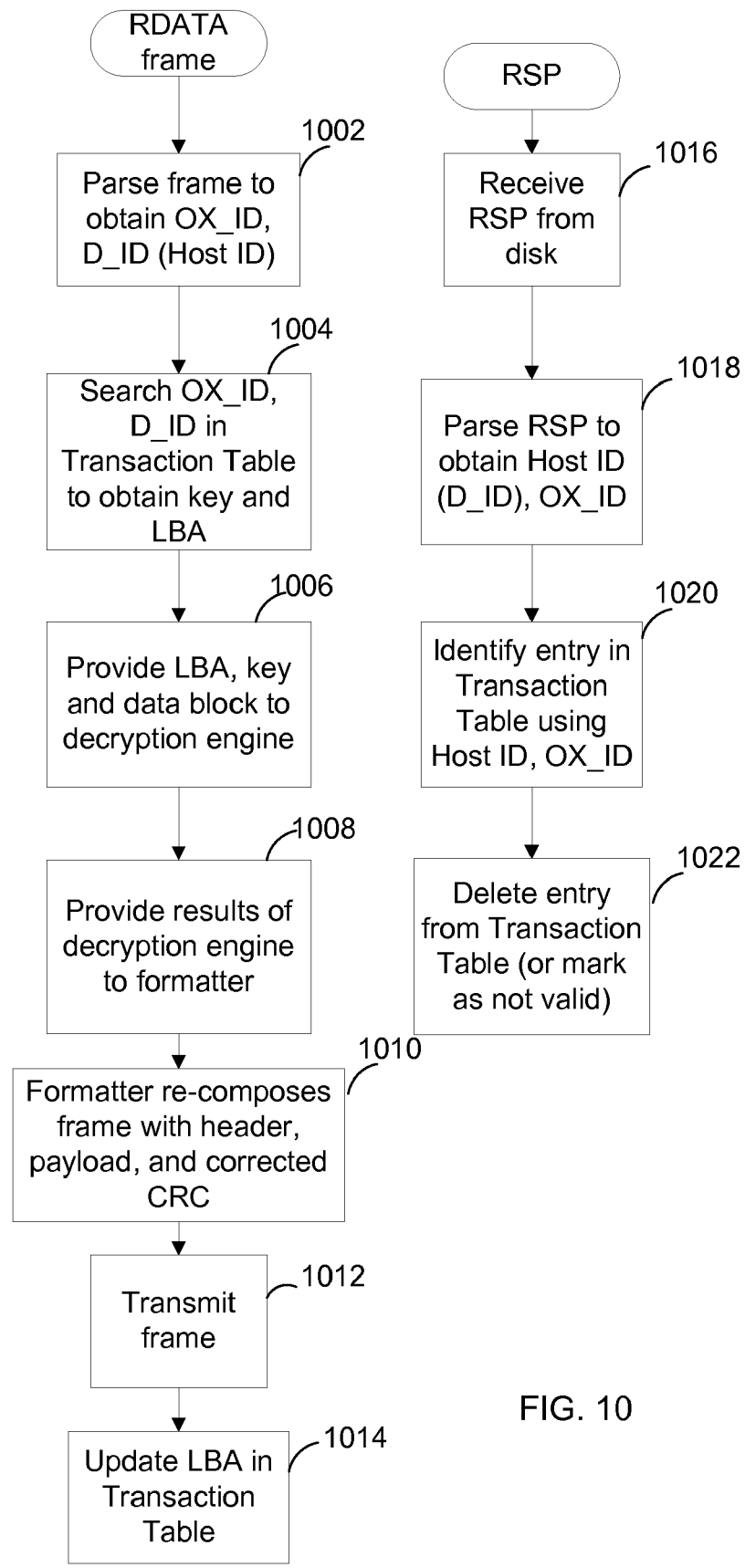
FIG. 10 is a process flow diagram illustrating a method of reading data from a storage medium in accordance with one embodiment of the invention.

After the read command has been processed and transmitted, data transmitted during the transaction may be read from the storage medium and transmitted to the host. FIG. 10 is a process flow diagram illustrating a method of reading data from a storage medium in accordance with one embodiment of the invention. When a port of the network device receives data in the form of a SCSI read, the read data frame (RDATA) is parsed at 1002 in order to identify the corresponding decryption key. For instance, the RDATA frame may be parsed to obtain the host identifier (D_ID) and OX_ID. The corresponding entry in a transaction table such as that illustrated in FIG. 4 may then identified at 1004. Specifically, the host identifier (D_ID) and OX_ID may be used to identify the entry in the transaction table. From the entry in the transaction table, the key to be used to decrypt the data may be identified. In addition, the LBA may also be identified.

In accordance with one embodiment, the decryption engine performs per-block decryption. In other words, the decryption engine processes entire blocks. Thus, in order to decrypt the data, the data block and key are provided to the decryption engine at 1006. More particularly, an entire block may be gathered (e.g., where a single packet carries a non-integral number of blocks) before it is presented to the decryption engine. In addition, the LBA may also be provided to the decryption engine, thereby enabling the decryption engine to decrypt the block using the key and LBA. Each block of data may be decrypted in this manner.

Once the data has been decrypted, the results of the decryption may be provided to a formatter at 1008. The formatter may then generate a frame including a header (e.g., Fibre Channel), payload (e.g., SCSI) including the decrypted data, and signature, as appropriate, at 1010. Various mechanisms are available for ensuring the integrity of the data without increasing the size of the frame with extra bit, as set forth above with respect to encryption. The generated frame is then transmitted at 1012 to its destination.

As data is retrieved from the storage medium, the address at which data is to be retrieved is typically incremented as data is retrieved. In accordance with one embodiment, the address (e.g., LBA) is incremented by the amount of data that has been retrieved and updated in the transaction table at 1014.

When a response indicating that the requested data has been retrieved has been transmitted by the disk and received by the port at 1016, the transaction table may be updated accordingly. In order to identify the appropriate entry in the transaction table, the host identifier (D_ID) and OX_ID are obtained from the response at 1018. The corresponding entry in the transaction table is then identified using the host identifier and OX_ID at 1020. The entry may then be deleted or marked as no longer valid at 1022.

In accordance with one embodiment, when a read or write command fails, the corresponding entry in the transaction table is deleted or marked as invalid. A new write or read command may then be transmitted in association with a new exchange. Information associated with this new exchange is stored in an entry in the transaction table as set forth above until the read or write is completed.

The above examples are described with reference to the storing or retrieval of an integral number of blocks of data. It is contemplated that a single block may be transmitted in two different frames rather than a single frame. For instance, if a block includes 512 bytes, 256 bytes of the block may be transmitted in one frame, while the remaining 256 bytes may be transmitted in a second frame. A simple example is the transmission of 5 blocks of data in two frames, where 2½ blocks are transmitted in each frame.

In accordance with one embodiment, a temporary buffer may be used to store partial blocks until the correct number of bytes has been received. The number of bytes in a partial block may be indicated in the transaction table entry as set forth above with reference to FIG. 4. When the number of bytes that have been received is greater than or equal to a block, the partial blocks may be concatenated so that an entire block may be encrypted and transmitted. As a result, the switch may transmit a different number of frames than that received by the switch.

In a credit-based system such as a Fibre Channel network, a number of buffers are typically allocated on a per-port basis at some initial time. Fibre Channel credits are then issued according to usage of the assigned buffers. Typically, when a storage medium returns a credit to the switch, the switch passes the credit on to the host. This credit management functionality assumes that the number of frames received by a network device such as a switch is equal to the number of frames transmitted by the switch.

As set forth above, in accordance with various embodiments of the invention, the number of frames received by a network device such as a switch may not be equal to the number of frames transmitted by the switch as a result of generation of new frames by the switch. As a result, the number of credits that have been issued will not correspond to the number of frames transmitted by the switch, and therefore the number of buffers that are consumed. In accordance with one embodiment, the switch may act as a "proxy" to modify the credit management. In other words, the switch may save the credit and pass the credit on to the host when a frame including an entire block is generated from two or more frames including partial blocks by the switch. In this manner, the credit management system may be modified to support the transmission of partial blocks.

Although the network device described above with reference to the disclosed embodiments are described as switches, this network device is merely illustrative. Thus, other network devices such as routers may be implemented to receive, process, modify and/or generate packets or frames with functionality such as that described above for transmission in a storage area network. Therefore other types of network devices may be implemented to perform the disclosed switching functionality.

The apparatus (e.g. switch or router) of this invention may be specially constructed for the required purposes, or may be a general-purpose programmable machine selectively activated or reconfigured by a computer program stored in memory. The processes presented herein are not inherently related to any particular router or other apparatus. In a preferred embodiment, any of the apparatus implementing embodiments of this invention may be specially configured routers such as specially configured router models 1700, 1800, 2500, 2600, 3200, 3600, 4000, 4500, 4700, 7200, 9000, and 7500 available from Cisco Systems, Inc. of San Jose, Calif. A general structure for some of these machines will appear from the description given below.

Generally, the techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid route optimization system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the roaming systems of this invention may be specially configured routers such as specially configured router models 350, 1100, 1200, 1400, 1600, 2500, 2600, 3200, 3600, 4500, 4700, 7200, 7500, 9000, and 12000 available from Cisco Systems, Inc. of San Jose, Calif. A general architecture for some of these machines will appear from the description given below. In an alternative embodiment, the encryption system may be implemented on a general-purpose network host machine such as a personal computer or workstation. Further, the invention may be at least partially implemented on a card (e.g., an interface card) for a network device or a general-purpose computing device.

Figure 11:
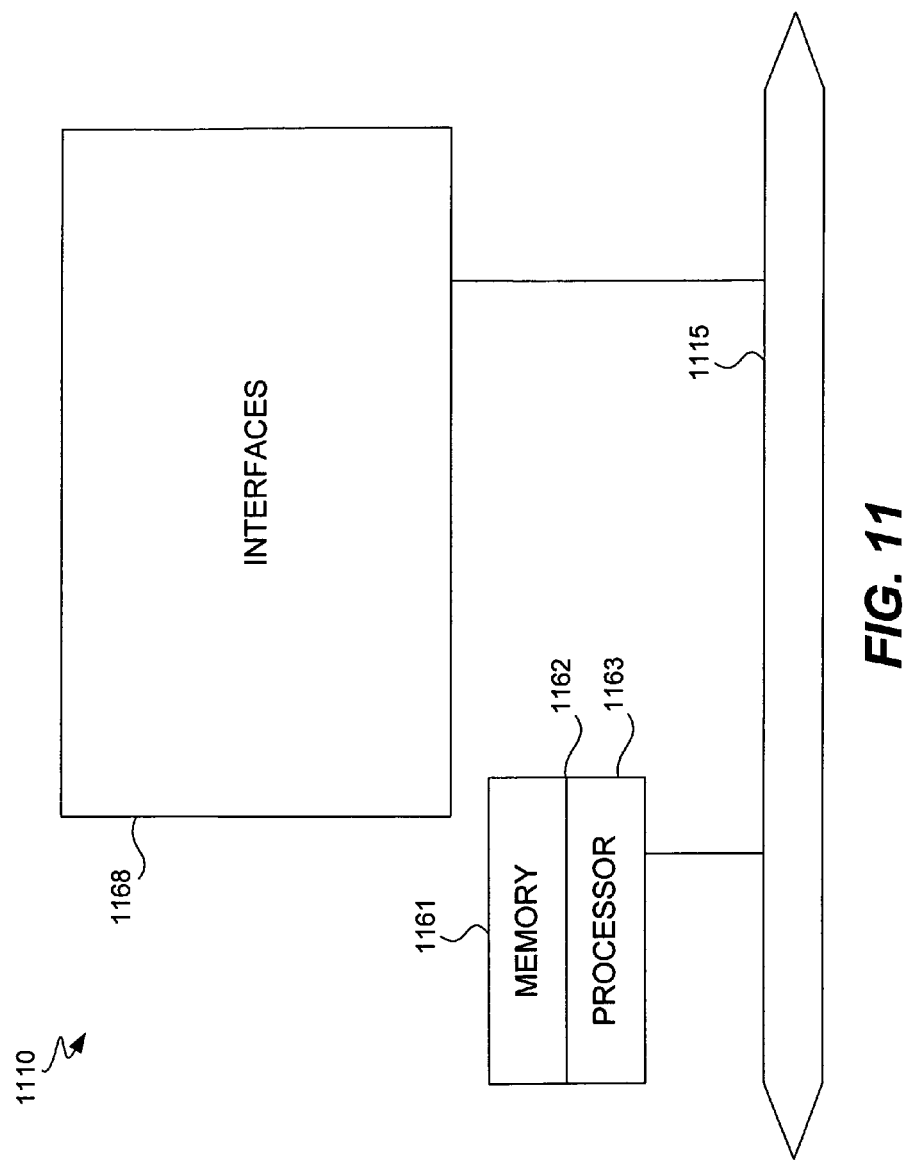
FIG. 11 is a diagrammatic representation of a router in which embodiments of the present invention may be implemented.

Referring now to FIG. 11, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetworking Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 11 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a computer-readable medium in which a carrier wave travels over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Moreover, although the example described refers primarily to Fibre Channel networks, the present invention may be used with other protocols. Therefore, the described embodiments should be taken as illustrative and not restrictive, and the invention should not be limited to the details given herein but should be defined by the following claims and their full scope of equivalents.

What is claimed is:

1. In a network device having a plurality of ports, a method of encrypting data, comprising:
    receiving by one of the plurality of ports a command frame, the command frame being a write command frame including a source identifier and a destination identifier, the source identifier identifying a host and the destination identifier identifying a storage medium;
    transmitting by the one of the plurality of ports the command frame to the destination identifier;
    receiving a frame including data by the one of the plurality of ports, the frame having a header including a source address and a destination address, wherein the source address identifies the host and the destination address identifies the storage medium;
    obtaining the data from the frame by the one of the plurality of ports;
    encrypting the data by the one of the plurality of ports to generate encrypted data;
    generating a modified frame including the encrypted data by the one of the plurality of ports; and
    transmitting the modified frame including the encrypted data by the one of the plurality of ports to the destination address;
    receiving a credit from the storage medium; and
    transmitting the credit to the host when the modified frame is generated and transmitted;
    wherein obtaining, encrypting, and generating are performed by a processor of the one of the plurality of ports such that encryption is automatically performed on a per-port basis by the processor of the one of the plurality of ports.

2. The method as recited in claim 1, wherein the network device is a switch.

3. The method as recited in claim 1, further comprising:
    retrieving a key associated with the storage medium from one of a set of key tables, the set of key tables including a first key table storing a first key for each one of a plurality of storage mediums and a second key table storing a second key for each one of the plurality of storage mediums.

4. The method as recited in claim 1, wherein transmitting the modified frame is performed via a transport protocol, wherein the transport protocol is Fibre Channel or iSCSI.

5. The method as recited in claim 1, wherein the frame is a SCSI frame including a set of blocks.

6. The method as recited in claim 1, wherein generating a modified frame comprises:
    appending a signature to the modified frame, wherein the signature corresponds to the encrypted data.

7. The method as recited in claim 5, further comprising:
    parsing the command frame to obtain the source identifier, the destination identifier, LUN, exchange identifier, and logical block address; and
    identifying a key corresponding to the source identifier, destination identifier, and LUN;
    populating an entry in a transaction table such that the entry includes the key, a host identifier including the source identifier, the exchange identifier, and the logical block address.

8. The method as recited in claim 7, further comprising:
    setting an indicator indicating that the command frame includes a write command, thereby indicating that the data is to be encrypted.

9. The method as recited in claim 7, further comprising:
    obtaining the source identifier and exchange identifier from the frame including the data;
    identifying an entry in the transaction table having a host identifier including the source identifier and the exchange identifier that have been obtained from the frame including the data;
    obtaining the key and the logical block address corresponding to the source identifier and the exchange identifier in the entry of the transaction table;
    encrypting the data using the key and the logical block address to generate the encrypted data.

10. The method as recited in claim 9, further comprising:
    updating the logical block address in the entry of the transaction table.

11. The method as recited in claim 9, further comprising:
    deleting the entry from the transaction table when a response is received or when the write command fails.

12. The method as recited in claim 9, wherein encrypting the data using the key and the logical block address is performed for one of the set of blocks at a time.

13. The method as recited in claim 5, wherein encrypting the data comprises:
    encrypting one of the set of blocks by the processor of the one of the plurality of ports.

14. The method as recited in claim 1, further comprising:
    when a transaction table is full, sending an error message in response to the command frame.

15. The method as recited in claim 1, wherein two or more of the plurality of ports each have distinct, dedicated logic for performing the obtaining, encrypting, and generating steps, wherein each distinct, dedicated logic is performed by a processor of only one of the two or more of the plurality of ports such that encryption is performed on a per-port basis by the distinct, dedicated logic for each of the two or more of the plurality of ports.

16. The method as recited in claim 1, wherein two or more of the plurality of ports each comprises a distinct processor for performing the obtaining, encrypting, and generating steps, wherein each distinct processor is dedicated to only one of the two or more of the plurality of ports such that encryption is automatically performed on a per-port basis by the distinct processor for each of the two or more of the plurality of ports.

17. The method as recited in claim 1, further comprising:
updating a transaction table by the processor of the one of the plurality of ports to include information pertaining to the write command frame.

18. In a network device having a plurality of ports, a method of decrypting data, comprising:
receiving by one of the plurality of ports a command frame, the command frame being a read command frame including a source identifier and a destination identifier, the source identifier identifying a host and the destination identifier identifying a storage medium;
transmitting by the one of the plurality of ports the command frame to the destination identifier;
receiving a frame including data by the one of the plurality of ports, the frame having a header including a source address and a destination address, wherein the source address identifies a storage medium and the destination address identifies a host;
obtaining the data from the frame by the one of the plurality of ports;
decrypting the data by the one of the plurality of ports to generate decrypted data;
generating a modified frame including the decrypted data by the one of the plurality of ports; and
transmitting the modified frame including the decrypted data by the one of the plurality of ports to the destination address;
receiving a credit from the storage medium; and
transmitting the credit to the host when the modified frame is generated and transmitted;
wherein obtaining, decrypting, and generating are performed by logic dedicated to the one of the plurality of ports such that decryption is automatically performed on a per-port basis.

19. The method as recited in claim 18, wherein the network device is a switch.

20. The method as recited in claim 18, wherein transmitting the modified frame is performed via a transport protocol, wherein the transport protocol is Fibre Channel or iSCSI.

21. The method as recited in claim 18, wherein the frame is a SCSI frame including a set of blocks.

22. The method as recited in claim 18, wherein generating a modified frame comprises:
appending a signature to the modified frame, wherein the signature corresponds to the decrypted data.

23. The method as recited in claim 21, further comprising:
receiving a command frame prior to receiving the frame including the data, the command frame including a read command;
parsing the command frame to obtain the source identifier, the destination identifier, LUN, exchange identifier, and logical block address;
identifying a key corresponding to the source identifier, destination identifier, and LUN; and
populating an entry in a transaction table such that the entry includes the key, a host identifier including the source identifier, the exchange identifier, and the logical block address.

24. The method as recited in claim 23, further comprising:
setting an indicator indicating that the command frame includes a read command, thereby indicating that the data is to be decrypted.

25. The method as recited in claim 23, further comprising:
obtaining the destination identifier and exchange identifier from the frame including the data;
identifying an entry in the transaction table having a host identifier including the destination identifier and the exchange identifier that have been obtained from the frame including the data;
obtaining the key and the logical block address corresponding to the destination identifier and the exchange identifier in the entry of the transaction table;
decrypting the data using the key and the logical block address to generate the decrypted data.

26. The method as recited in claim 25, further comprising:
updating the logical block address in the entry of the transaction table.

27. The method as recited in claim 25, further comprising:
deleting the entry from the transaction table when a response is received or when the read command fails.

28. The method as recited in claim 25, wherein the frame including the data is a SCSI frame including a set of blocks, and wherein decrypting the data using the key and the logical block address is performed for one of the set of blocks at a time.

29. The method as recited in claim 21, wherein decrypting the data comprises:
decrypting one of the set of blocks.

30. The method as recited in claim 18, wherein obtaining, decrypting, and generating are performed by an independent processor of the one of the plurality of ports such that decryption is automatically performed on a per-port basis by the independent processor of the one of the plurality of ports.

31. A network device having a plurality of ports, the network device being adapted for encrypting data, comprising:
means for receiving by a processor of one of the plurality of ports a command frame, the command frame being a write command frame including a source identifier and a destination identifier, the source identifier identifying a host and the destination identifier identifying a storage medium;
means for transmitting by the processor of the one of the plurality of ports the command frame to the destination identifier;
means for receiving a frame including data by the processor of the one of the plurality of ports, the frame having a header including a source address and a destination address, wherein the source address identifies the host and the destination address identifies the storage medium;
means for obtaining the data from the frame by the processor of the one of the plurality of ports;
means for encrypting the data by the processor of one of the plurality of ports to generate encrypted data;
means for generating a modified frame including the encrypted data by the processor of the one of the plurality of ports; and
means for transmitting the modified frame including the encrypted data by the processor of the one of the plurality of ports to the destination address such that encryption is automatically performed on a per-port basis;

means for receiving a credit from the storage medium; and
means for transmitting the credit to the host when the modified frame is generated and transmitted.

32. The network device as recited in claim 31, wherein a number of credits are allocated on a per-port basis to each of the plurality of ports.

33. A network device having a plurality of ports, the network device being adapted for decrypting data, comprising:
a plurality of ports;
wherein one or more of the plurality of ports each includes a separate, dedicated processor that is configured for performing the following steps:
receiving a command frame, the command frame being a write command frame including a source identifier and a destination identifier, the source identifier identifying a host and the destination identifier identifying a storage medium;
transmitting the command frame to the destination identifier;
receiving a frame including data, the frame having a header including a source address and a destination address, wherein the source address identifies the host and the destination address identifies the storage medium;
obtaining the data from the frame;
encrypting the data to generate encrypted data;
generating a modified frame including the encrypted data;
transmitting the modified frame including the encrypted data to the destination address, thereby performing encryption on a per-port basis
receiving a credit from the storage medium; and
transmitting the credit to the host when the modified frame is generated and transmitted.

34. The network device as recited in claim 33, wherein each of two or more of the plurality of ports of the network device comprises one of two or more processors, wherein each of the two or more processors is dedicated to performing the obtaining, decrypting, and generating for a different single one of the two or more of the plurality of ports such that decryption is automatically performed on a per-port basis by each of the two or more of the plurality of ports.

35. An apparatus, comprising:
a plurality of ports;
wherein one or more of the plurality of ports each includes a separate, dedicated processor that is dedicated to one of the plurality of ports, the dedicated processor being configured for performing the following steps:
receiving by one of the plurality of ports a command frame, the command frame being a write command frame including a source identifier and a destination identifier, the source identifier identifying a host and the destination identifier identifying a storage medium;
transmitting by the one of the plurality of ports the command frame to the destination identifier;
obtaining by the one of the plurality of ports data from a frame received by the one of the plurality of ports, the frame having a header including a source address and a destination address, wherein the source address identifies the host and the destination address identifies the storage medium;
encrypting the data by the one of the plurality of ports to generate encrypted data;
generating a modified frame including the encrypted data by the one of the plurality of ports;
transmitting the modified frame including the encrypted data by the one of the plurality of ports to the destination address;
receiving a credit from the storage medium; and
transmitting the credit to the host when the modified frame is generated and transmitted.

36. The apparatus as recited in claim 35, wherein two or more of the plurality of ports each has a separate, dedicated processor for performing the obtaining, encrypting, generating, and transmitting steps, wherein each separate, dedicated processor is implemented within only one of the two or more of the plurality of ports such that encryption is automatically performed on a per-port basis by the separate, dedicated processor for each of the two or more of the plurality of ports.

37. The apparatus as recited in claim 35, wherein two or more of the plurality of ports each comprises a separate processor for performing the obtaining, encrypting, generating, and transmitting steps, wherein each separate processor is dedicated to only one of the two or more of the plurality of ports such that encryption is automatically performed on a per-port basis by the separate processor for each of the two or more of the plurality of ports.

* * * * *